US008478695B2

(12) United States Patent
Simcik et al.

(10) Patent No.: US 8,478,695 B2
(45) Date of Patent: Jul. 2, 2013

(54) TECHNIQUE FOR EFFECTIVELY GENERATING POSTAGE INDICIA USING A POSTAL SECURITY DEVICE

(75) Inventors: Mark E. Simcik, Bloomfield, CT (US); Allen A. Crowf, Prospect, CT (US)

(73) Assignee: Neopost Technologies, Bagneux (FR)

( * ) Notice: Subject to any disclaimer, the term of this patent is extended or adjusted under 35 U.S.C. 154(b) by 1495 days.

(21) Appl. No.: 11/703,772

(22) Filed: Feb. 8, 2007

(65) Prior Publication Data

US 2007/0136216 A1 Jun. 14, 2007

Related U.S. Application Data

(63) Continuation of application No. 09/674,947, filed as application No. PCT/US99/24204 on Oct. 15, 1999, now abandoned.

(51) Int. Cl.
*G06Q 20/00* (2012.01)

(52) U.S. Cl.
USPC .................................. 705/60; 705/50; 705/61

(58) Field of Classification Search
USPC ............................................................ 705/60
See application file for complete search history.

(56) References Cited

U.S. PATENT DOCUMENTS

| | | | |
|---|---|---|---|
| 313,787 A | 3/1885 | Hoevenbergh | |
| 4,447,890 A | 5/1984 | Duwel et al. | |
| 4,632,252 A | 12/1986 | Haruki et al. | |
| 4,725,718 A | 2/1988 | Sansone et al. | |
| 4,743,747 A | 5/1988 | Fougere et al. | |
| 4,757,537 A | 7/1988 | Edelmann et al. | |
| 4,775,246 A | 10/1988 | Edelmann et al. | |
| 4,802,218 A | 1/1989 | Wright et al. | |
| 4,812,994 A | 3/1989 | Taylor et al. | |
| 4,831,555 A | 5/1989 | Sansone et al. | |
| 4,853,865 A | 8/1989 | Sansone et al. | |
| 4,853,961 A | 8/1989 | Pastor | |
| 4,858,138 A | 8/1989 | Talmadge | |
| 4,934,846 A * | 6/1990 | Gilham | 400/104 |
| 4,941,176 A | 7/1990 | Matyas et al. | |
| 4,949,381 A | 8/1990 | Pastor | |
| 5,103,478 A | 4/1992 | Matyas et al. | |
| 5,142,577 A | 8/1992 | Pastor | |
| 5,181,245 A | 1/1993 | Jones | |

(Continued)

FOREIGN PATENT DOCUMENTS

| | | |
|---|---|---|
| CA | 2225443 | 10/1997 |
| CA | 2263437 | 12/1998 |
| EP | 0 876 026 A2 | 4/1998 |
| JP | 11-27311 | 1/1999 |

OTHER PUBLICATIONS

English translation of the abstract for JP11-27311.

(Continued)

*Primary Examiner* — Chrystina Zelaskiewicz
(74) *Attorney, Agent, or Firm* — Morris & Kamlay LLP

(57) ABSTRACT

In a franking system, a postal security device (PSD) is used to account for postage dispensation, and generate digital signatures for inclusion in postage indicia to authenticate same. In accordance with the invention, the PSD includes multiple crypto processors which participate in franking transactions and generate the digital signatures in a multiplexed manner. Each crypto processor verifies the accounting of postage dispensation leading to and including the transactions in which the crypto processor participates. In addition, the crypto processors re-create transaction records and store them therein in a distributed manner.

20 Claims, 5 Drawing Sheets

U.S. PATENT DOCUMENTS

| | | | | | |
|---|---|---|---|---|---|
| 5,377,268 | A | | 12/1994 | Hunter | |
| 5,448,641 | A | | 9/1995 | Pintsov et al. | |
| 5,510,992 | A | | 4/1996 | Kara | |
| 5,535,279 | A | * | 7/1996 | Seestrom | 380/55 |
| 5,559,890 | A | | 9/1996 | Obermeier et al. | |
| 5,586,036 | A | * | 12/1996 | Pintsov | 705/408 |
| 5,603,410 | A | | 2/1997 | Kara | |
| 5,606,507 | A | | 2/1997 | Kara | |
| 5,666,284 | A | | 9/1997 | Kara | |
| 5,666,421 | A | | 9/1997 | Pastor et al. | |
| 5,682,318 | A | | 10/1997 | Kara | |
| 5,715,164 | A | * | 2/1998 | Liechti et al. | 705/410 |
| 5,717,597 | A | | 2/1998 | Kara | |
| 5,774,886 | A | | 6/1998 | Kara | |
| 5,778,076 | A | | 7/1998 | Kara | |
| 5,781,438 | A | | 7/1998 | Lee et al. | |
| 5,796,834 | A | | 8/1998 | Whitney et al. | |
| 5,796,836 | A | | 8/1998 | Markham | |
| 5,801,364 | A | | 9/1998 | Kara et al. | |
| 5,801,944 | A | | 9/1998 | Kara | |
| 5,805,701 | A | | 9/1998 | Ryan, Jr. | |
| 5,812,991 | A | | 9/1998 | Kara | |
| 5,819,240 | A | | 10/1998 | Kara | |
| 5,822,739 | A | | 10/1998 | Kara | |
| 5,825,893 | A | | 10/1998 | Kara | |
| 5,982,506 | A | | 11/1999 | Kara | |
| 5,983,209 | A | | 11/1999 | Kara | |
| 6,073,125 | A | | 6/2000 | Cordery et al. | |
| 6,128,735 | A | | 10/2000 | Goldstein et al. | |
| 6,347,143 | B1 | * | 2/2002 | Goff et al. | 380/37 |
| 7,272,581 | B2 | | 9/2007 | Athens et al. | |

OTHER PUBLICATIONS

Information-based indicia program (IBIP), Performance criteria for information-based indicia and security architecture for open IBI postage evidencing systems, XP-002161216, Jun. 25, 1999, 37 pages.

Szewerenko et al. "Giving linkers their due"; Electronic Design, Nov. 20, 1995, vol. 43, No. 24, p. 131-132, 134-135 and 139-140 (abstract only).

* cited by examiner

*FIG. 1*
100
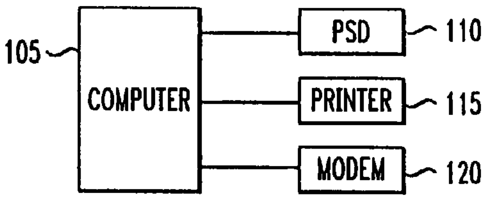
*FIG. 3*
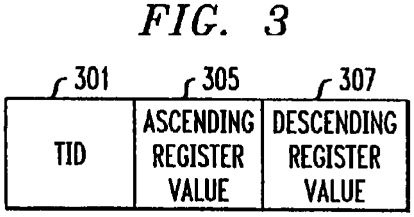
*FIG. 4*
403 | 405
| TID | n |
|---|---|
| 1 | 1 |
| 2 | 2 |
| ⋮ | ⋮ |
| N | N |
| N + 1 | 1 |
| N + 2 | 2 |
| ⋮ | ⋮ |
| kN | N |
| kN + 1 | 1 |
| kN + 2 | 2 |
| ⋮ | ⋮ |

110

500

TECHNIQUE FOR EFFECTIVELY GENERATING POSTAGE INDICIA USING A POSTAL SECURITY DEVICE

This is a continuation of application number 09/674,947 filed Nov. 8, 2000, now abandoned which is a 371 national phase of PCT/US99/24204 filed 15 Oct. 1999, the contents of which are incorporated herein by reference.

TECHNICAL FIELD

The invention relates to franking systems and methods, and more particularly to a system and method in which a postal security device (PSD) is used to generate postage indicia.

BACKGROUND OF THE INVENTION

Stemming from the proliferation of use of personal computers (PCs), software has been made commercially available for installation in a PC to frank or print a postage indicium, serving as proof of postage, on an envelope or a label using a conventional printer connected to the PC. In addition, because of the increasing popularity of the Internet, services have been provided to download postage funds through the Internet to a postal security device (PSD) which may be connected to the PC and is used to account for postage dispensation.

To allow printing of postage indicia using a conventional printer, which is typically unsecured, a postal authority, e.g., the United States Postal Service (USPS), promulgated specifications for the PSD to secure the accounting of the postage dispensation, and for the postage indicia to detect possible fraud. For example, these specifications include the "Information-Based Indicia Program (IBIP) Performance Criteria for Information-Based Indicia and Security Architecture for Open IBI Postage Evidencing Systems," dated Jun. 25, 1999; and "Information-Based Indicia Program (IBIP) Performance Criteria for Information-Based Indicia and Security Architecture for Closed IBI Postage Metering Systems," Jan. 12, 1999, respectively.

According to such specifications, a postage indicium includes not only a human readable portion including text such as the date of mailing and amount of postage, but also a machine readable portion in the form of a two-dimensional barcode. The machine readable portion contains information concerning, e.g., the mailing date, the postage amount, an identification (ID) of the PSD being used, a mail class, a software ID, etc. To detect possible fraud, such information is cryptographically signed, resulting in a digital signature, also included in the machine readable portion, for authenticating the postage indicium.

In general, a PSD has a secure housing, and within the secure housing are accounting registers and a cryptographic engine. These accounting registers typically include an ascending register and a descending register. As is well known, the ascending register is used to keep track of the amount of postage dispensed. On the other hand, the descending register is used to keep track of the postage fund amount available for postage dispensation. The cryptographic engine generates the aforementioned digital signature resulting from signing the machine readable information to authenticate the postage indicium, in accordance with a well known public key algorithm. One such public key algorithm may be the Digital Signature Algorithm (DSA) described, e.g., in "Digital Signature Standard (DSS)," *FIPS PUB* 186, May 19, 1994. The engine also carries out cryptographic authentication and signing for communications with an external device such as a remote computer system maintained by a postage franking machine manufacturer or of the postal authority. For example, such communications may be used to set up and maintain the PSD, and to replenish the postage fund by adjusting the value of the descending register in the PSD.

SUMMARY OF THE INVENTION

In accordance with the invention, multiple crypto processors are used in a PSD to participate in franking transactions in a multiplexed manner to dispense postage. Among other things, these crypto processors generate digital signatures for inclusion in postage indicia to authenticate the same. For example, where a digital signature contains a first signature value r independent of any input to the PSD, and a second signature value s dependent on certain inputs to the PSD in accordance with the DSA, the number of crypto processors used is determined based on a first duration for computing the signature value r and a second duration for computing the signature value s.

In an illustrative embodiment, a main processor in the PSD generates accounting data concerning postage dispensation for all of the franking transactions, and creates and stores records of the transactions. Such accounting data includes, e.g., ascending and descending register values. In accordance with an aspect of the invention, as each crypto processor takes turns participating in the franking transactions, the crypto processor independently generates accounting data concerning postage dispensation for the transactions associated with the crypto processor. Advantageously, the independently generated accounting data is used to verify the corresponding accounting data generated by the main processor. When such corresponding accounting data is verified, the crypto processor creates and stores records of the franking transactions associated therewith. As a result, the crypto processors jointly re-create the records of all of the franking transactions, and store the created records in a distributed manner.

BRIEF DESCRIPTION OF THE DRAWING

Further objects, features and advantages of the invention will become apparent from the following detailed description taken in conjunction with the accompanying drawing, in which:

FIG. 1. is a block diagram of a franking system in accordance with the invention for conducting franking transactions to generate postage indicia;

FIG. 3 illustrates a format of a franking transaction record stored in the PSD of FIG. 2;

FIG. 4 is a table associating each franking transaction with a respective one of crypto processors in the PSD participating in the franking transaction;

DETAILED DESCRIPTION

FIG. 1 illustrates franking system 100 embodying the principles of the invention for generating postage indicia. In this particular illustrative embodiment, system 100 is configured as an "open system," where computer 105 may be a conventional personal computer (PC) serving as a host device, and where postal security device (PSD) 110, printer 115 for franking or printing postage indicia, and modem 120 are peripherals to computer 105. Alternatively, computer 105 may be a workstation or any other general purpose computing machine. In addition, modem 120 in this instance is shown as an external modem, it will be appreciated that any internal modem or network interface card (NIC) within computer 105 may be used, instead.

Figure 2:
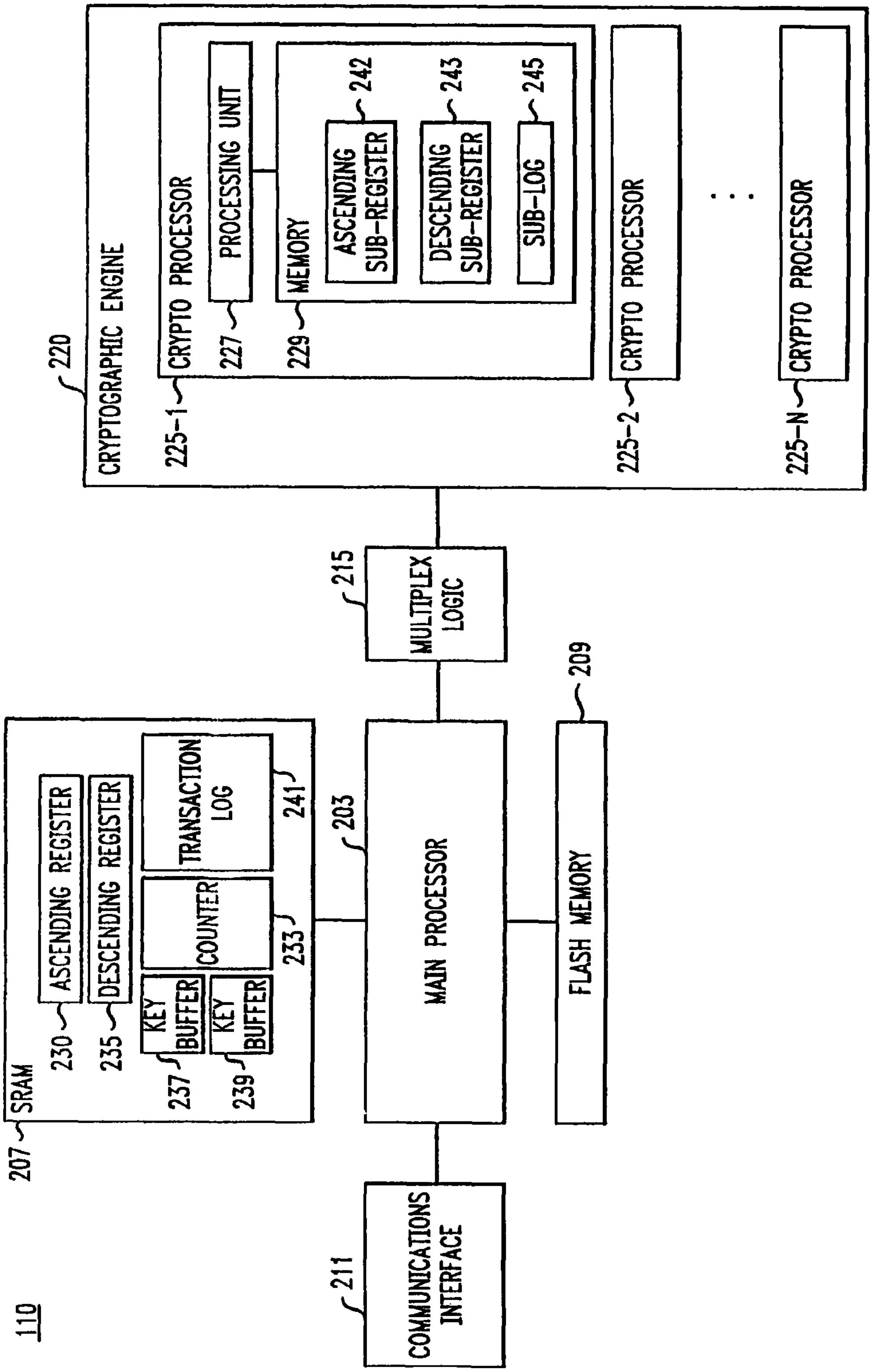
FIG. 2 is a block diagram of a postal security device (PSD) used in the franking system of FIG. 1.

FIG. 2 illustrates PSD 110 in accordance with the invention. PSD 110 may be secured by well known hardware protection means and other tamper resistance methodologies. As shown in FIG. 2, PSD 110 comprises main processor 203, static random-access memory (SRAM) 207, a non-volatile memory, e.g., flash memory 209, communications interface 211 for interfacing with computer 105, multiplex logic 215, and cryptographic engine 220. In this instance, SRAM 207 stores an ascending register value in ascending register 230, a descending register value in descending register 235, a first pair of public key and private key in key buffer 237, a second pair of public key and private key in key buffer 239, transaction log 241 for recording past franking transactions, counter 233 and other administrative information.

As is well known, ascending register 230 is used to keep track of the amount of postage dispensed. On the other hand, descending register 235 is used to keep track of the postage fund amount available for postage dispensation. When the descending register value decreases over time below a predetermined limit, system 100 can no longer dispense postage until descending register 235 is reset. Such a reset may be achieved by way of electronic funds transfer, in accordance with a well known telemeter setting (TMS) technique, via a communication connection (e.g., a dial-up connection or an Internet connection) established by modem 120 to a remote computer system handling TMS transactions.

Because the contents of SRAM 207 need to be refreshed from time to time, SRAM 207 is required to be powered by a battery (not shown) in PSD 110. For fear that the battery power should be unexpectedly out, the ascending and descending register values, and the transaction log are redundantly stored in flash memory 209 whose contents, unlike those of SRAM 207, need not be refreshed. Flash memory 209 also contains program instructions for processor 203 to orchestrate the operation of PSD 110. This operation includes generation of digital signatures for inclusion in postage indicia to be franked or printed by printer 115 on envelopes, or labels for application onto mailpieces. The digital signatures are used to authenticate the respective postage indicia.

For example, in accordance with the USPS "Information-Based Indicia Program (IBIP) Performance Criteria for Information-Based Indicia and Security Architecture for Closed IBI Postage Metering Systems," Jan. 12, 1999, a postage indicium includes not only a human readable portion containing text such as the date of mailing and amount of postage, but also a machine readable portion in the form of a two-dimensional barcode. The machine readable portion contains postal data elements including, e.g., the mailing date, the postage amount, the ascending and descending register values, an identification (ID) of the PSD being used, a mail class and a software ID, and a digital signature resulting from digitally signing such postal data elements.

The generation of the digital signature and subsequent verification thereof require use of the public key and private key pair in buffer 237, in accordance with a well known public key algorithm. In a conventional manner, the pair of keys are generated mathematically. In this particular illustrative embodiment, the public key algorithm used is the Digital Signature Algorithm (DSA) described, e.g., in "Digital Signature Standard (DSS)," *FIPS PUB* 186, May 19, 1994. Cryptographic engine 220 described below uses the private key in buffer 237 to sign the aforementioned postal data elements. The resulting digital signature, which is distinct for each postage indicium, is included in the machine readable portion thereof.

Unlike the public key which may be made available to the public in the postage indicium, the corresponding private key needs to be securely stored in PSD 110. Otherwise, using the private key which is illegally obtained by, say, tampering with PSD 110, a perpetrator may fraudulently generate postage indicia without accounting for the postage expended. Thus, to prevent fraud, for example, any tampering with PSD 110 may cause the power of the battery therein to be cut off, thereby "zeroizing" or clearing the contents of SRAM 207, including any private key therein.

Similarly, the public and private key pair in key buffer 239, different from the key pair in buffer 237, is used for authenticating communications with the aforementioned remote computer system to set up and maintain PSD 110, and to replenish the postage fund therein in a manner described before.

In accordance with the invention, cryptographic engine 220 includes N crypto processors, denoted 225-1 through 225-N, where N is an integer determined optimally in a manner to be described. In this illustrative embodiment, each crypto processor is structurally identical. For example, similar to every other crypto processor, crypto processor 225-1 comprises, inter alia, processing unit 227 and memory 229. In order to fully appreciate the operation of engine 220 involving crypto processors 225-1 through 225-N in generating digital signatures, the make-up of a digital signature will now be described.

In this instance, a digital signature is composed of a first signature value r which is 20 bytes long, and a second signature value s which is also 20 bytes long. In accordance with the DSA, the generation of the signature value r involves generation of a random (or pseudo-random) integer k in each franking transaction. The value r is a function of the integer k and certain given DSA parameters, and independent of the aforementioned postal data elements to be signed. However, the generation of the signature value s involves applying a secure hash algorithm (SHA) onto the postal data elements to be signed. One such SHA is described in "Secure Hash Standard," *FIPS PUB* 180-1, Apr. 17, 1998.

Specifically, the signature value s, dependent on the values of the postal data elements to be signed, may be expressed as follows:

$$s=(k^{-1}(SHA(M)+xr))\bmod q, \quad (1)$$

where "$k^{-1}$" represents the multiplicative inverse of the random integer k; "M" represents the postal data elements to be signed onto which the SHA is applied; "x" represents the value of the aforementioned private key stored in key buffer 237; "r" represents the aforementioned first signature value; and "mod q" represents a standard modulus operation having a base q, which is one of the given DSA parameters. It should be noted at this point that the time required to calculate r (Tr) is much longer than that required to calculate s (Ts).

Since the first signature value r is independent of the values of the postal data elements to be signed, i.e., M in expression (1), in accordance with an aspect of the invention, engine 220 has crypto processors 225-1 through 225-N each pre-calculate r even before receiving the actual postal data elements to be signed in a franking transaction. When the actual postal data elements are received by engine 220, any crypto processor having an available pre-calculated r can be used to calculate s in accordance with expression (1), thereby generating the digital signature. Thus, with the pre-calculated r, the time that the crypto processor takes to generate the digital signature virtually equals the time required to generate the second signature value s, i.e., Ts, which is relatively short.

To increase the digital signature generation efficiency, multiplex logic 215 of conventional design is employed to feed sets of postal data elements from main processor 203, corresponding to a sequence of franking transactions, to crypto processors 225-1 through 225-N in a multiplexed manner for them to take turns generating digital signatures. It should be noted that the maximum multiplex rate by multiplex logic 215, or the maximum rate of generation of the digital signatures, in this instance is 1/Ts assuming that pre-calculated r's are used. It can be shown that the minimum number of crypto processors (N in this instance) needed can be determined using the following equation so that when multiplex logic 215 distributes a set of postal data elements to be signed, at least one of the crypto processors in engine 220 is available with a pre-calculated r to generate the corresponding s, and thus the corresponding digital signature:

$$N = \begin{cases} Tr/Ts & \text{if } Tr/Ts = \text{ a whole number} \\ \lfloor Tr/Ts \rfloor + 1 & \text{if } Tr/Ts \neq \text{ a whole number} \end{cases}, \quad (2)$$

where [•] represents a standard floor function which takes the value of only the integer portion of the argument "•" expressed as a decimal; and Tr and Ts represent the Limes required to calculate r and s, respectively, as mentioned before.

To keep track of the franking transactions handled by PSD 110, main processor 203 maintains counter 233 in SRAM 207, which counts in an ascending order starting from zero. Processor 203 causes counter 233 to increase its count by one each time to account for a new franking transaction. Thus, the current count, denoted TID, is used to identify the franking transaction being conducted. Main processor 203 also maintains transaction log 241 which records past franking transactions. FIG. 3 illustrates the format of each transaction record in log 241. In this instance, each transaction is identified by a TID in field 301 of the record. Field 305 contains the ascending register value as a result of the transaction. Field 307 contains the descending register value as a result of the transaction.

As mentioned before, crypto processors 205-1 through 205-N generate digital signatures for a sequence of franking transactions in a multiplexed manner. Specifically, crypto processor 205-n, where 1≦n≦N, is assigned by multiplex logic 215 to generate digital signatures for the transactions having TIDs=n, N+n, 2N+n, . . . , kN+n, . . . , where k is an integer greater than or equal to zero. FIG. 4 illustrates a schedule associating each TID in column 403 identifying a franking transaction with a respective value of n in column 405 identifying one of the crypto processors which generates the digital signature for that transaction.

In accordance with another aspect of the invention, each crypto processor is used not only to generate the digital signature for each franking transaction associated therewith, but also to verify the accounting of the ascending and descending register values leading to the transaction, and to record the transaction in a log when the accounting is verified. To that end, each crypto processor includes an ascending sub-register, a descending sub-register and a sub-log in its memory. For example, crypto processor 225-1 includes ascending sub-register 242, descending sub-register 243, and sub-log 245 in memory 229.

When PSD 110 is initially put in service, the value stored in the ascending sub-register of each crypto processor is set to equal that stored in ascending register 230, hereinafter referred to as the "initial ascending register value." Similarly, the value stored in the descending sub-register of each crypto processor is set to equal that stored in descending register 235, hereinafter referred to as the "initial descending register value." When the first franking transaction is conducted to dispense first postage, main processor 203 causes counter 233 to increase its count from zero to one, thereby identifying the first franking transaction with TID=1. In addition, main processor 203 polls the current values of ascending register 230 and descending register 235, respectively. Main processor 203 then deducts the first postage value from the current descending register value (which is the initial descending register value in this instance), and adds the first postage value to the current ascending register value (which is the initial ascending register value in this instance). The resulting ascending and descending register values are temporarily stored in a first buffer (not shown) and a second buffer (not shown) in SRAM 207, which are referred to as the "temporary ascending register value" and "temporary descending register value," respectively. Main processor 203 thereafter transmits to engine 220, through multiplex logic 215, a first ensemble of information including (a) the TID identifying the current transaction (in this instance TID=1), (b) the first postage value, (c) the temporary ascending register value, (d) the temporary descending register value, and (e) a first set of postal data elements which need to be signed by one of the crypto processors in engine 220 to generate a digital signature.

Multiplex logic 215 is programmed to route the first ensemble having TID=1 to crypto processor 225-1, in accordance with the schedule of FIG. 4. The communication channel between crypto processor 225-1 and main processor 203 is maintained by multiplex logic 215 until a second ensemble having a different TID is routed thereby. After receiving the first ensemble including the aforementioned items (a) through (e), unit 227 independently computes the ascending and descending register values as a result of the franking transaction being conducted based on the postage value in item (b), and the current values in ascending sub-register 242 and descending sub-register 243, which in this instance are the initial ascending and descending register values, respectively. Specifically, unit 227 computes the ascending register value by adding the postage value in item (b) to the value in ascending sub-register 242, and the descending register value by deducting the postage value in item (b) from the value in descending sub-register 243. Unit 227 then compares the independently computed ascending and descending register values with the received temporary ascending register value in item (c) and temporary descending register value in item (d), respectively. If the computed and temporary ascending register values do not match, and/or the computed and temporary descending register values do not match, unit 227 generates and transmits an exceptional signal to main processor 203. In response, the latter may (i) re-conduct the current transaction, or (ii) may cause an error message to be displayed on computer 105, and franking system 100 to be inoperative until it is satisfactorily audited and re-started by authorized personnel. Otherwise, if the computed and temporary ascending register values match, and the computed and temporary descending register values match, unit 227 overwrites ascending sub-register 242 with the computed ascending register value, and descending sub-register 243 with the computed descending register value. In addition, unit 227 posts the current franking transaction by creating a record in sub-log 245 which corresponds to TID=1 and includes therein the computed ascending and descending register values in the format of FIG. 3. Unit 227 then generates the digital signature for the franking transaction by signing the postal data elements in item (e) in a manner described above. Unit 227 transmits the digital signature to main processor 203 for inclusion in a postage indicium. In response, processor 203, among other things, overwrites ascending register 230 with the temporary ascending register value in the first buffer, and descending register 235 with the temporary descending register value in the second buffer. In addition, processor 203 posts the transaction by creating a record in log 241 which corresponds to TID=1 and includes therein the updated values of ascending register 230 and descending register 235 in the format of FIG. 3. Thus, at the end of the first transaction, ascending sub-register 242 of crypto processor 225-1 contains the same ascending register value as ascending register 230; descending sub-register 243 contains the same descending register value as descending register 235; and sub-log 245 includes the same record corresponding to TID=1 as log 241.

In addition, the values in ascending register 230 and descending register 235 and the newly created record in log 241 are redundantly stored by main processor 203 in flash memory 209.

Continuing the above example, in conducting the second franking transaction, identified by TID=2, to dispense second postage, main processor 203 similarly generates temporary ascending and descending register values based on the second postage value. In this instance, the temporary ascending register value equals the current value of ascending register 230 plus the second postage value; and the temporary descending register value equals the current value of descending register 235, less the second postage value. These temporary values are to be verified by crypto processor 225-2 associated with the second transaction before the second transaction is posted. To that end, main processor 203 creates a second ensemble for transmission to crypto processor 225-2 through multiplex logic 215. This second ensemble contains information including (a) the TID identifying the current transaction (in this instance TID=2), (b) the second postage value, plus the first postage value, (c) the temporary ascending register value, (d) the temporary descending register value, and (e) a second set of postal data elements need to be signed to generate a second digital signature. Thus, the first and second ensembles contain similar information except item (b) therein. Item (b) in the second ensemble includes not only the current, second postage value, but also the past, first postage value. This stems from the fact that crypto processor 225-2, like every other crypto processor in engine 220, is periodically engaged to conduct franking transactions. In this instance, the ascending sub-register and descending sub-register of crypto processor 225-2 stand at the initial ascending register value and initial descending register value, respectively, which correspond to TID=0. With the past, first postage value, the ascending and descending sub-registers can "catch up" with the current values in ascending register 230 and descending register 235 corresponding to TID=1. To that end, crypto processor 225-2 adds the first postage value to the value in the ascending sub-register thereof and deducts the first postage value from the value in the descending sub-register thereof. The second postage value is further added to the ascending sub-register value, and deducted from the descending sub-register value to verify the validity of the temporary ascending register value in item (c) and that of the temporary descending register value in item (d) of the second ensemble, which correspond to TID=2. If the temporary values are valid, i.e., the resulting ascending sub-register value equal to the temporary ascending register value and the resulting descending sub-register value equal to the temporary descending register value, the accounting leading up to and including the current transaction is verified. In that case, crypto processor 225-2 similarly posts the current transaction by creating a record in its sub-log corresponding to TID=2 in the format of FIG. 3, digitally signs the postal data elements in item (e), and transmits the resulting digital signature to main processor 203 for inclusion in a postage indicium. In response, processor 203, among other things, overwrites ascending register 230 with the temporary ascending register value, and descending register 235 with the temporary descending register value. In addition, processor 203 posts the transaction by creating a record in log 241 corresponding to TID=2 in the format of FIG. 3. Thus, at the end of the second transaction, the ascending sub-register in crypto processor 225-2 contains the same ascending register value as ascending register 230; the descending sub-register in crypto processor 225-2 contains the same descending register value as descending register 235; and the sub-log in crypto processor 225-2 includes the same record corresponding to TID=2 as log 241.

Similarly, crypto processors 225-3 through 225-N are periodically engaged to conduct franking transactions. As a result, the sub-log in crypto processor 225-*n*, $1 \leqq n \leqq N$, contains transaction records corresponding to TID=n, n+N, . . . , n+kN, . . . . That is, crypto processor 225-1 includes in its sub-log transaction records corresponding to TID=1, N+1, 2N+1, . . . ; crypto processor 225-2 includes in its sub-log transaction records corresponding to TID=2, N+2, 2N+2, . . . ; and so on and so forth. In other words, the transaction records in log 241 corresponding to all of the transactions are re-created by, and stored in, crypto processors 225-1 through 225-N in a distributed manner. Advantageously, the sub-logs of crypto processors 225-1 through 225-N can be jointly used to verify the records in log 241 to detect any tampering therewith.

Because of the periodic engagement of each crypto processor, in order for the ascending sub-register and descending sub-register of the crypto processor to "catch up" with the current values of ascending register 230 and descending register 235, in general, item (b) of the ensemble transmitted to the crypto processor needs to include not only the postage value in the current transaction, say, with TID=p, but the postage values in the last p−1 transactions if p<N, or the postage values in the last N−1 transactions if $p \geqq N$.

Figure 5:
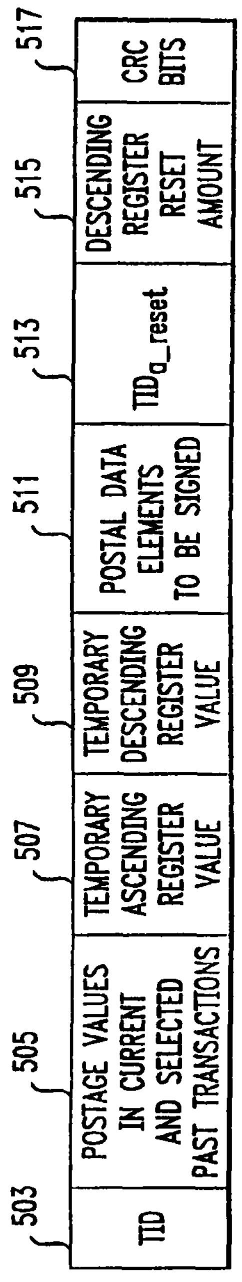
FIG. 5 is a format of an ensemble of information prepared by a processor in the PSD.

FIG. 5 illustrates generic ensemble 500 generated by main processor 203 for transmission to a crypto processor. As shown in FIG. 5, field 503 of ensemble 500 includes the TID identifying the current franking transaction, i.e., item (a) described above. Field 505 includes the respective postage values in the current and selected past transactions, i.e., item (b) just described, which are arranged in chronological order in the field. Field 507 includes the temporary ascending register value to be verified, i.e., item (c) described above. Field 509 includes the temporary descending register value to be verified, i.e., item (d) described above. Field 511 includes a set of postal data elements to be signed to generate a digital signature, i.e., item (e) described above.

As mentioned before, a reset of descending register 235 occurs when postage funds are replenished in PSD 110, thereby increasing the value in descending register 235. A reset of ascending register 230 occurs when the ascending register value reaches a predetermined maximum value, thereby re-starting ascending register 230 at a predetermined reset value, e.g., zero. Thus, in order to completely "catch up" with the current ascending and descending register values, the ascending sub-register and descending sub-register of each crypto processor need to take into account any reset of ascending register 230 and descending register 235, respectively. To that end, field 513 includes the TIDA identifying the franking transaction immediately before a reset of ascending register 230 occurs. For example, when ascending register 230 is reset between transactions TID=2250 and TID=2251, $TID_{a\_reset}$=2250. To ensure that the $TID_{a\_reset}$ is relevant, $TID_{a\_reset}$ has to be greater than or equal to the current TID−N, or else $TID_{a\_reset}$ is set to zero.

In addition, main processor 203 determines $TID_{d\_reset}$ identifying the franking transaction immediately before any reset of descending register 235. If current TID>$TID_{d\_reset} \geqq$ current TID−N, main processor 203 provides in field 515 of ensemble 500 an increased postage amount resulting from the reset of descending register 235, referred to as the "descending register reset amount." The default value for field 515 is zero.

Figure 6:
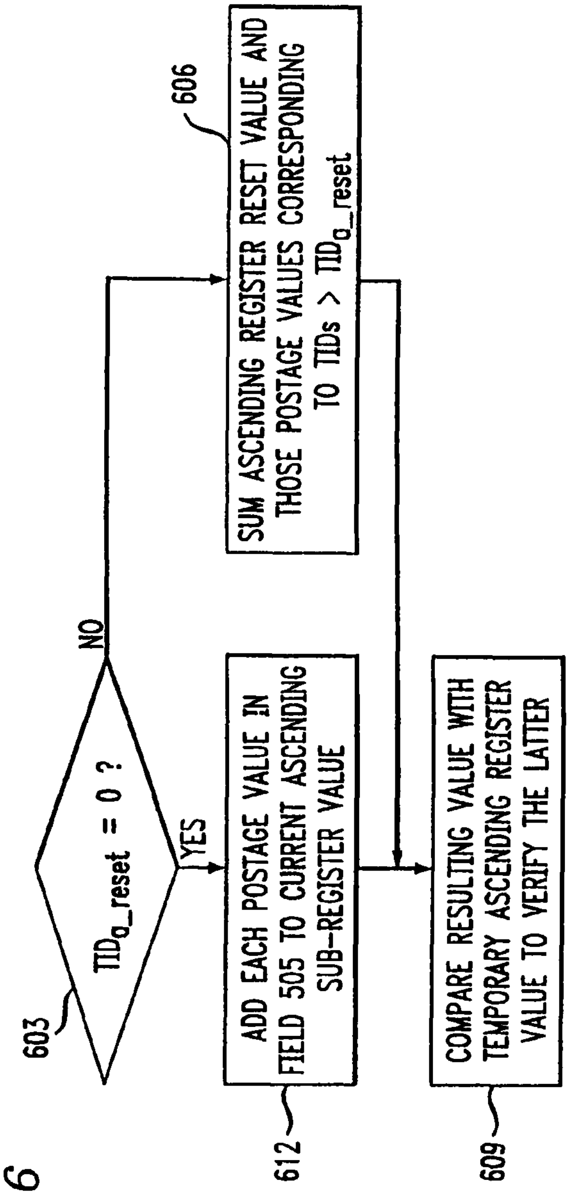
FIG. 6 illustrates a process for verifying a temporary ascending register value based on certain information in the ensemble of FIG. 5.

Thus, with ensemble 500, to verify the temporary ascending register value in field 507, a crypto processor receiving the ensemble needs to determine whether $TID_{a\_reset}$ in field 513 is equal to 0, as indicated at step 603 in FIG. 6. If $TID_{a\_reset} \neq 0$, the crypto processor sums the ascending register reset value and only those postage values in field 505 which correspond to $TIDs > TID_{a\_reset}$, as indicated at step 606. Otherwise, if $TID_{a\_reset}=0$, the crypto processor adds each postage value in field 503 to the current value in its ascending sub-register, as indicated at step 612. The resulting value at step 606 or 612 is compared with the temporary ascending register value to verify the latter, as indicated at step 609.

Referring back to FIG. 5, to verify the temporary descending register value in field 509, the crypto processor adds the descending register reset amount in field 515 to, and subtracts each postage value in field 505 from, the current value in its descending sub-register. The resulting value is then compared with the temporary descending register value.

Field 517 of ensemble 500 includes cyclic redundancy check (CRC) bits, resulting from performing well known binary block CRC coding on the contents of fields 503, 505, 507, 509, 511, 513 and 515, for detecting any error in the ensemble occasioned during its transmission to the crypto processor.

Figure 7A:
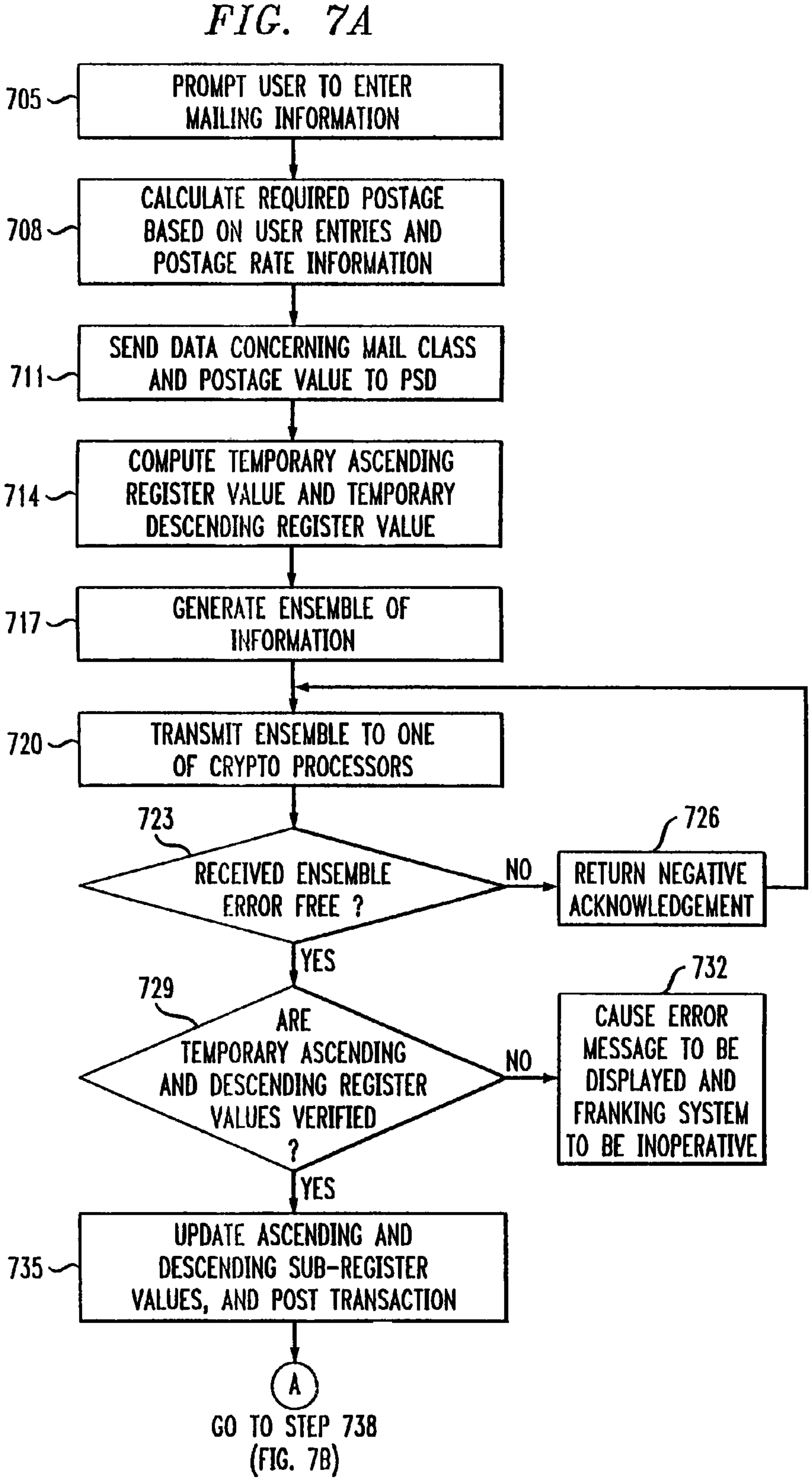
FIGS. 7A and 7B jointly illustrate a process for generating a postage indicium using the system of FIG. 1.

In operation, when a user at computer 105 conducts a franking operation to print a postage indicium, the user is prompted to enter mailing information concerning the destination zip code, weight, mail class (or rate category), any special services, etc., of a mailpiece to be mailed, as indicated at step 705 in FIG. 7A. Assuming in this instance that a rate module is pre-installed in computer 105 which provides postage rate information, computer 105 at step 708 calculates the required postage value for mailing the mailpiece. At step 711, computer 105 sends the data concerning the current mail class and postage value to PSD 110. In response, main processor 203 in PSD 110 at step 714 computes a temporary ascending register value and a temporary descending register value based on the current postage value in a manner described above. At step 717, main processor 203 generates an ensemble of information similar to ensemble 500 whose format and contents are described above. At step 720, main processor 203 transmits the ensemble to one of the crypto processors, say, crypto processor 225-1, under the control of multiplex logic 215.

Based on the CRC bits in field 617 of the received ensemble, processing unit 227 at step 723 in crypto processor 225-1 determines whether the received ensemble is error free. If it is determined that the received ensemble is erroneous, unit 227 at step 726 returns a negative acknowledgement to main processor 203 for re-transmission of the ensemble. Otherwise, unit 227 at step 729 verifies the temporary ascending register value and the temporary descending register value by comparing them with the register values independently computed by unit 227 in a manner described above. If the temporary register values cannot be verified, unit 227 in this instance causes an error message to be displayed on computer 105, and franking system 100 to be inoperative until it is satisfactorily audited and re-started by authorized personnel, as indicated at step 732.

Figure 7B:
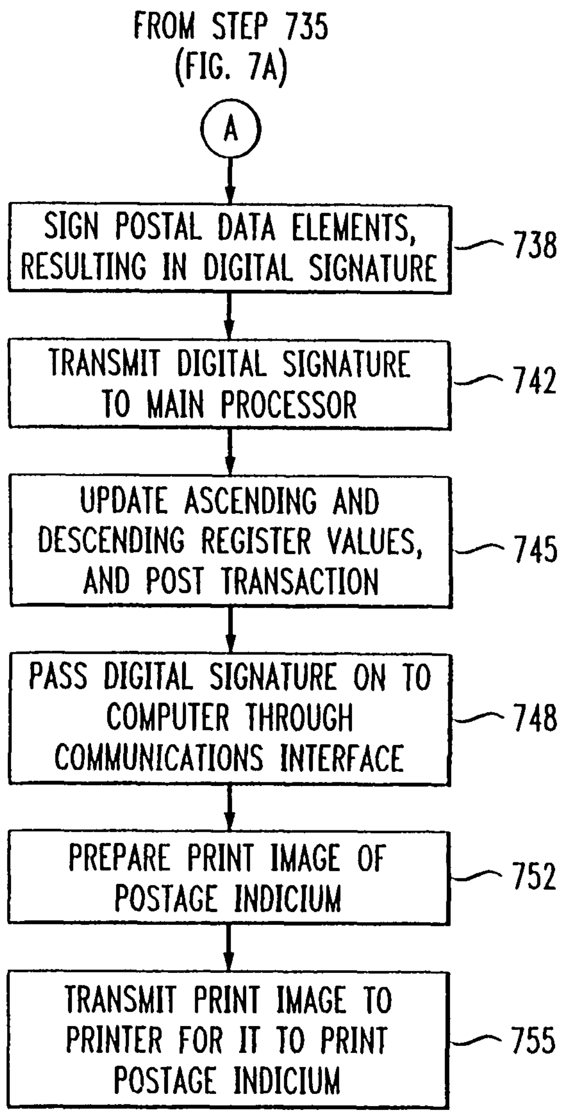

Otherwise, if the temporary ascending and descending register values are verified, unit 227 at step 735 updates the values in ascending sub-register 242 and descending sub-register 243, and posts the current franking transaction in sub-log 245 in a manner described above. In addition, unit 227 at step 738 in FIG. 7B signs the postal data elements in field 511 of the received ensemble, resulting in a digital signature for inclusion in the postage indicium to be generated. This digital signature is transmitted to main processor 203, as indicated at step 742. After receiving the digital signature, main processor 203 at step 745 updates the values in ascending register 203 and descending register 235, and posts the current transaction in log 241 in a manner described above. At step 748, main processor 203 passes the received digital signature on to computer 105 through communications interface 211. The latter at step 752 prepares a print image of a postage indicium representing the required postal information and digital signature. Alternatively, main processor 203 itself may create the print image of the postage indicium and pass it on to computer 105. In any event, computer 105 transmits the print image to printer 115 at step 755 for it to print the postage indicium on a label or an envelope fed thereto.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, the DSA of the DSS is illustratively used for authenticating postal data in a postage indicium, another well-known data authentication algorithm such as the RSA or Elliptic Curve algorithm may be used, instead.

In addition, in the disclosed embodiment, franking system 100 is configured as an open system. It will be appreciated that the franking system may be configured as a closed system in the form of a postage meter including therein a dedicated printer.

Finally, PSD 110 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A postal security device for conducting a plurality of postal franking transactions, comprising:

a memory programmed to store a descending register value and an ascending register value;

a processor programmed to generate accounting data and postal data elements for each postal franking transaction, the accounting data comprising the descending register value, the ascending register value and a postage value request;

a cryptographic engine comprising a plurality of cryptographic processors, each cryptographic processor comprising a memory storing an ascending sub-register value and a descending sub-register value for the cryptographic processor; and a multiplexer programmed to sequentially route the accounting data and the postal data elements of each of the postal franking transactions to one of the cryptographic processors;

wherein each of the cryptographic processors is assigned to a subset of the plurality of postal franking transactions;

wherein each of the cryptographic processors is programmed to generate a code to authenticate the accounting data and the postal data elements for each of the postal franking transactions in the subset of each cryptographic processor; and wherein each of the cryptographic processors is programmed to verify at least one of the associated sub-register values with the corresponding register value prior to performing a franking transaction.

2. The postal security device of claim 1, wherein each of the cryptographic processors pre-computes a portion of the code prior to receiving the postal data elements and the accounting data for each of the postal franking transactions in the subset of each cryptographic processor.

3. The postal security device of claim 2, wherein the pre-computed portion of the code for each of the postal franking transactions is independent of the provided accounting data and the postal data elements.

4. The postal security device of claim 2, wherein the pre-computed portion of the code comprises a random number.

5. The postal security device of claim 1, wherein the code comprises a digital signature.

6. The postal security device of claim 1, wherein the accounting data routed to each of the cryptographic processors further comprises a postage value representative of a prior postal franking transaction performed by a different cryptographic processor.

7. The postal security device of claim 1, wherein the postal data elements comprise a transaction index value that sequentially identifies each of the postal franking transactions and assigns each of the cryptographic processors to the subset of the plurality of postal franking transactions.

8. The postal security device of claim 7, wherein the multiplexer routes the accounting data and the postal data elements for each postal franking transaction to one of the cryptographic processors based on the transaction index value.

9. A method for conducting a plurality of postal franking transactions using a plurality of cryptographic processors, comprising:

determining an ascending register value and a descending register value for each postal franking transaction;

generating accounting data and postal data elements for each postal franking transaction, the accounting data comprising the descending register value, the ascending register value and a postage value request;

sequentially routing the accounting data and the postal data elements of each of the postal franking transactions to one of the cryptographic hardware processors, wherein each of the cryptographic hardware processors is assigned to a subset of the plurality of postal franking transactions; and for each subset of transactions, verifying at least one of an ascending sub-register value and a descending sub-register value associated with the cryptographic hardware processor to which the transactions are assigned, by comparing the at least one sub-register value to the corresponding register value prior to performing a franking transaction;

wherein each of the cryptographic hardware processors generates a code authenticating the accounting data and the postal data elements for each of the postal franking transactions in the subset of each cryptographic hardware processor.

10. The method of claim 9, further comprising each of the cryptographic processors pre-computing a portion of the code prior to receiving the accounting data and the postal data elements for each of the postal franking transactions in the subset of each cryptographic processor.

11. The method of claim 10, wherein the pre-computed portion of the code is independent of the received accounting data and the postal data elements.

12. The method of claim 10, wherein the pre-computed portion of the code comprises a random number.

13. The method of claim 9, wherein the code comprises a digital signature.

14. The method of claim 9, wherein the accounting data routed to each of the plurality of cryptographic processors includes a postage value representative of a prior postal franking transaction performed by a different cryptographic processor.

15. The method of claim 9, further comprising, prior to conducting any of the postal franking transactions, generating a transaction index value to sequentially identify each of the postal franking transactions and to assign each of the cryptographic processors to the subset of the plurality of postal franking transactions.

16. The method of claim 15, further comprising routing the accounting data and the postal data elements for each postal franking transaction to one of the plurality of cryptographic processors based on the transaction index.

17. A method for conducting a plurality of postal franking operations using a plurality of cryptographic processors, comprising, for each of the plurality of postal franking operations:

sending accounting data and postal data elements to a selected one of the plurality of cryptographic hardware processors, the accounting data comprising a descending register value, an ascending register value and a postage value request; and generating, by the selected cryptographic hardware processor, a digital signature authenticating the accounting data and the postal data elements, a portion of the digital signature being pre-computed by the cryptographic hardware processor prior to receiving the accounting data and the postal data elements;

wherein, for the kth postal franking operation performed using cryptographic hardware processors numbered 1 through N, the selected cryptographic hardware processor j is selected according to $j=((k-1) \bmod N)+1$.

18. The method of claim 17, further comprising:

prior to generating the digital signature by the selected cryptographic processor, setting a plurality of sub-register values to match at least one of the descending register value and the ascending register value, each sub-register associated with one of the plurality of cryptographic processors.

19. The method of claim 18, further comprising, for a postal franking operation performed subsequent to a first postal franking operation, the step of setting the value of a sub-register associated with the subsequent operation to match the value of a sub-register associated with the first postal franking operation.

20. The method of claim 17, wherein the accounting data sent to the cryptographic processor j comprises accounting data sent to a previous cryptographic processor j−1.

* * * * *